April 7, 1953

R. C. McMILLAN 2,633,977

BELT CONVEYER TAKE-UP

Filed Nov. 28, 1950

INVENTOR
*Ralph C. McMillan*

BY
ATTORNEY

April 7, 1953  R. C. McMILLAN  2,633,977
BELT CONVEYER TAKE-UP
Filed Nov. 28, 1950  6 Sheets-Sheet 2

INVENTOR
Ralph C. McMillan
BY
ATTORNEY

April 7, 1953  R. C. McMILLAN  2,633,977
BELT CONVEYER TAKE-UP

Filed Nov. 28, 1950  6 Sheets-Sheet 3

INVENTOR
Ralph C. McMillan
BY
ATTORNEY

April 7, 1953 R. C. McMILLAN 2,633,977
BELT CONVEYER TAKE-UP
Filed Nov. 28, 1950 6 Sheets-Sheet 4

INVENTOR
Ralph C. McMillan
BY 
ATTORNEY

April 7, 1953

R. C. McMILLAN 2,633,977

BELT CONVEYER TAKE-UP

Filed Nov. 28, 1950

INVENTOR
Ralph C. McMillan
BY
ATTORNEY

April 7, 1953   R. C. McMILLAN   2,633,977
BELT CONVEYER TAKE-UP

Filed Nov. 28, 1950   6 Sheets-Sheet 6

INVENTOR
Ralph C. McMillan
BY 
ATTORNEY

Patented Apr. 7, 1953

2,633,977

UNITED STATES PATENT OFFICE 2,633,977

BELT CONVEYER TAKE-UP

Ralph C. McMillan, Palos Park, Ill., assignor to Link-Belt Company, a corporation of Illinois Application November 28, 1950, Serial No. 197,921

16 Claims. (Cl. 198—208)

This invention relates in general to a belt conveyor take-up and more specifically to a gravity take-up incorporating a safety device which will operate to check the fall of the take-up counterweight in the event of failure of certain parts of the conveyor.

In belt conveyor installations utilizing a belt of substantial length, it is essential that some means be provided to maintain the proper belt tension during all periods of operation of the conveyor. One of the simplest and most practical belt tensioning devices for installations of this type is the gravity take-up which includes a counterweight suspended from a loop in the return run of the belt. The counterweight rises and falls in accordance with changes in the length of the belt and maintains the proper belt tension.

The weight of the counterweight required to maintain the desired belt tension will vary in accordance with the length of the conveyor, the type of material to be conveyed, the degree of slope, if any, of the conveyor path and other similar factors. It is not unusual to employ counterweights which weigh from three to six tons.

Because of the type of construction of the building in which a belt conveyor is located; the proximity of the take-up mechanism to the locations of other equipment and where persons are required to work; and the personal injury and property damage that can result if the belt, or some belt supporting part of the conveyor, were to break and permit the massive counterweight to fall, it frequently is too hazardous to employ a gravity take-up to provide the proper tension for a conveyor belt.

The primary object of this invention is to provide a gravity take-up for belt conveyors which is so constructed that its counterweight will be permitted to move freely so long as it is supported by and is thereby functioning to maintain the proper tension in the belt, but its counterweight will be immobilized, in time to prevent personal injury or property damage, if some portion of the conveyor fails in such a way as to free the counterweight of its proper support by the belt.

A further object of the invention is to provide a belt conveyor take-up which has a plurality of independently actuated elements operable to immediately immobilize the take-up counterweight upon the sudden release of the tension in the belt or upon gradual downward movement of the counterweight beyond the lower limit of its normal vertical movement.

Still another object of the invention is to provide a belt conveyor gravity take-up having a plurality of independently actuated, self-energizing cam elements adapted to engage a stationary frame to immobilize the take-up counterweight upon failure of the belt to support the counterweight within its desired range of movement.

Other objects and advantages of the invention will be apparent during the course of the following description.

In the accompanying drawings forming a part of this specification and in which like reference characters are employed to designate like parts throughout the same.

Figures 1, 9, 10:
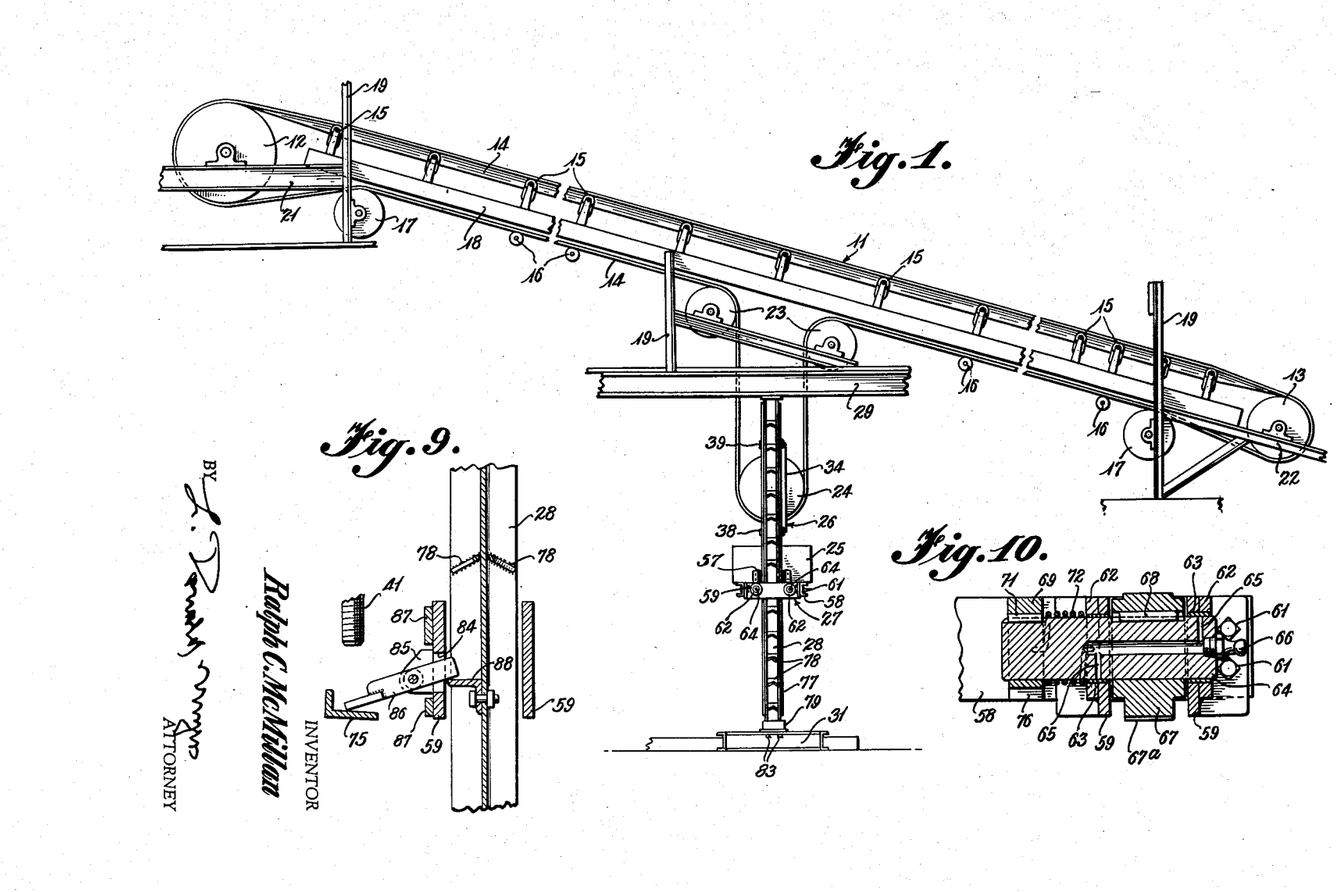
Figure 1 is a side elevational view of a belt conveyor provided with the gravity take-up device embodying the invention.
Figure 9 is a detail vertical sectional view taken on line 9—9 of Fig. 4.
Figure 10 is a detail vertical sectional view taken on line 10—10 of Fig. 4.

In the drawings, wherein for the purpose of illustration, is shown the preferred embodiment of the invention, and first particularly referring to Fig. 1, reference character 11 designates in its entirety an inclined belt conveyor which consists primarily of a head pulley 12, a tail pulley 13, a plurality of troughing idler rolls 15 and a plurality of return idler rolls 16 all of which function to properly train and support the conveyor belt 14. Snubbing pulleys 17 are employed to increase the arc of contact between the belt and the head and tail pulleys, 12 and 13, respectively. The troughing idler rolls 15 and the return idler rolls 16 are mounted on beams 18 which are suitably supported by the vertical posts 19. The head pulley 12 is mounted on a frame 21 and its associated snubbing pulley 17 is mounted on one of the vertical posts 19. The tail pulley 13 is mounted on a frame 22 and its associated snubbing pulley 17 is mounted on the adjacent vertical post 19.

The return run of the belt 14 passes over and extends downwardly between a pair of spaced pulleys 23 to form a depending loop in which is supported a counterweight pulley 24. A counterweight, comprising a box 25 containing cement or any other suitable heavy material, is in turn suspended from the pulley 24 by a frame 26. A safety device, designated in its entirety by the reference character 27, is suitably connected to the counterweighted box 25. Vertical rails 28, extending between and connected to the upper beam 29 and the base 31, are provided to guide the pulley 24, the counterweighted box 25 and the safety device 27 during their vertical movements.

Figures 2, 8:
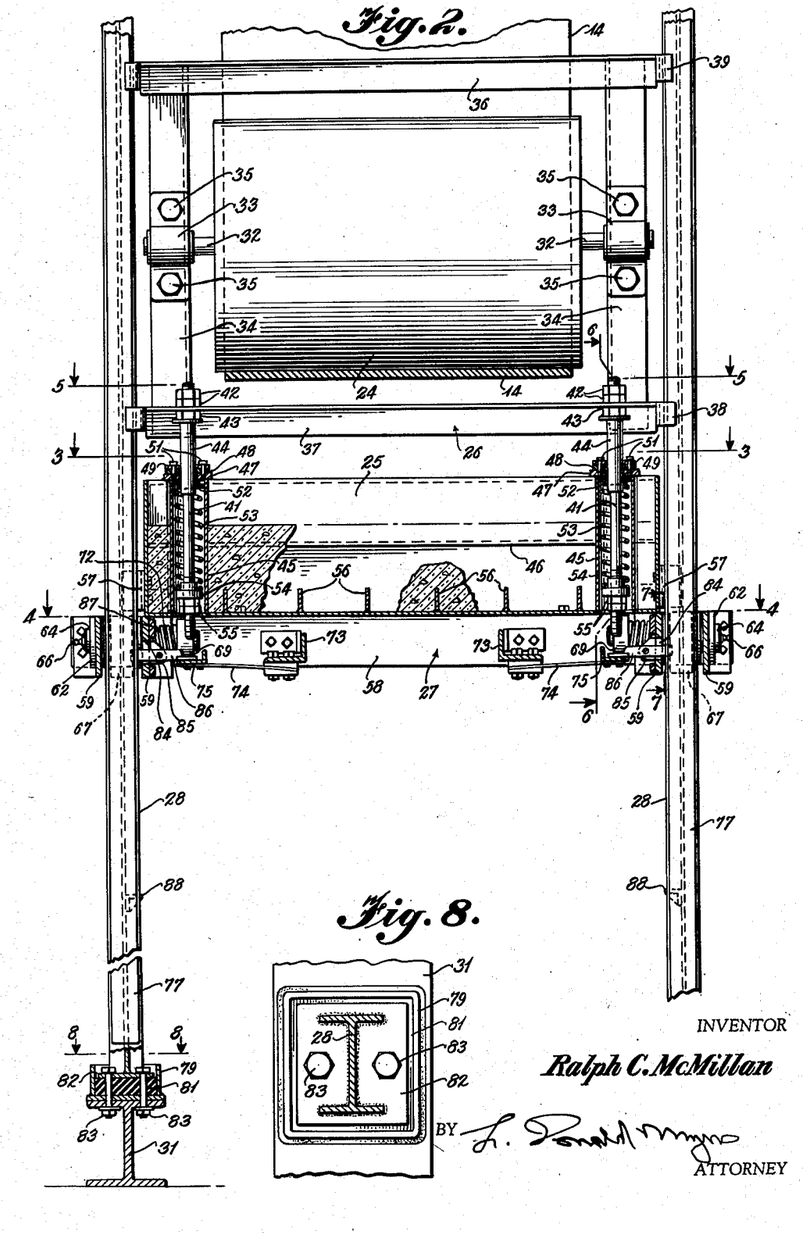
Figure 2 is a partly vertical sectional and partly side elevational view of the take-up device illustrated in Fig. 1.
Figure 8 is a detail horizontal sectional view taken on line 8—8 of Fig. 2.
Figure 3:
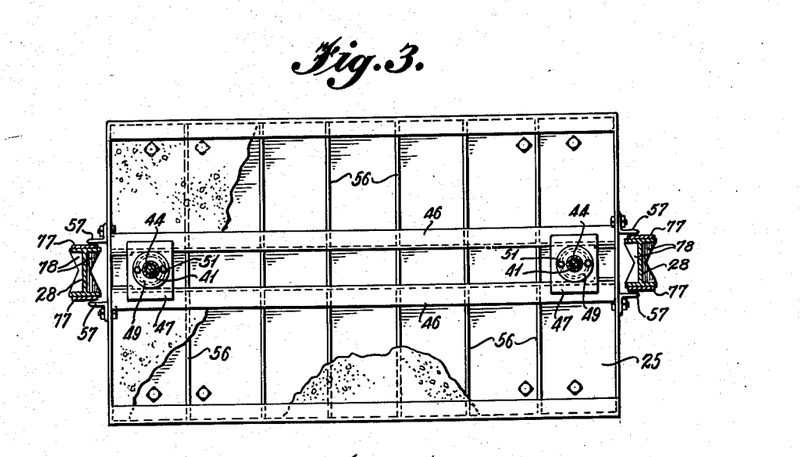
Figure 3 is a horizontal sectional view taken on line 3—3 of Fig. 2.

Referring now to Figs. 1 and 2 for a description of the association of the take-up device with the conveyor belt 14, the pulley 24 rests in the loop of the belt and has its shaft 32 projecting axially at both ends for rotatable support on the sides 34 of the frame 26 by the bearings 33 which are secured in place by bolts 35. The sides 34 are connected at their upper and lower ends by the cross bars 36 and 37, respectively. The cross bar 37 is provided with guide flanges 38 at its opposite ends for engaging the vertical guide rails 28. The cross bar 36 is provided with similar guide rail engaging flanges 39.

Figure 6:
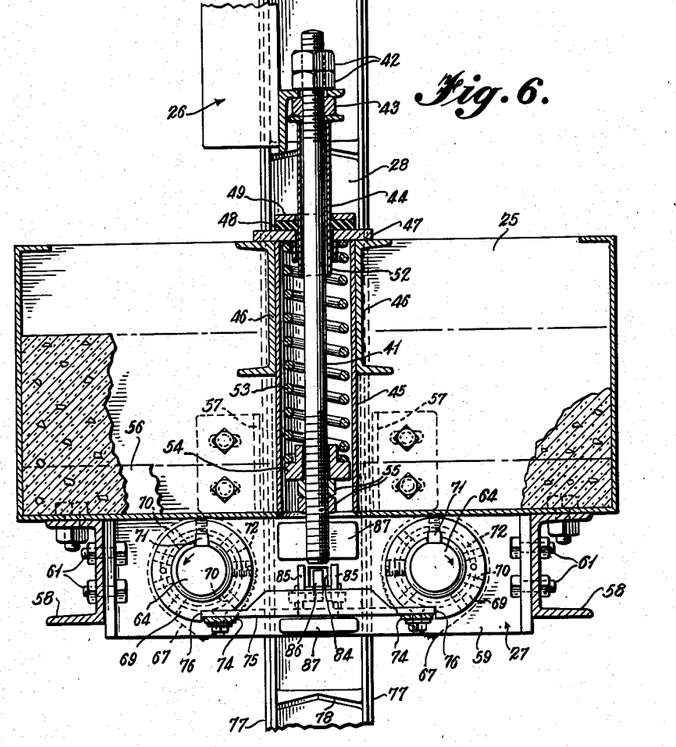
Figure 6 is a detail vertical sectional view taken on line 6—6 of Fig. 2.
Figure 7:
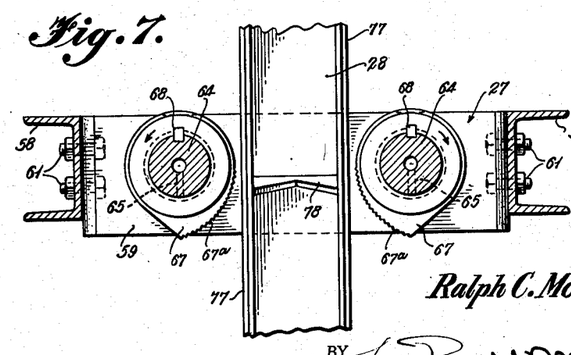
Figure 7 is a detail vertical sectional view taken on line 7—7 of Fig. 2.

Figs. 2 and 6 best illustrate the counterweighted box 25 as being suspended from the cross bar 37 by a pair of trip rods 41 which are threaded at their opposite end portions. The upper end portions of the rods 41 extend through the cross bar 37 and are connected thereto by nuts 42 and 43. A depending sleeve 44 is suitably connected to each of the nuts 43 for enclosing the adjacent portion of the associated rod 41.

Figure 12:
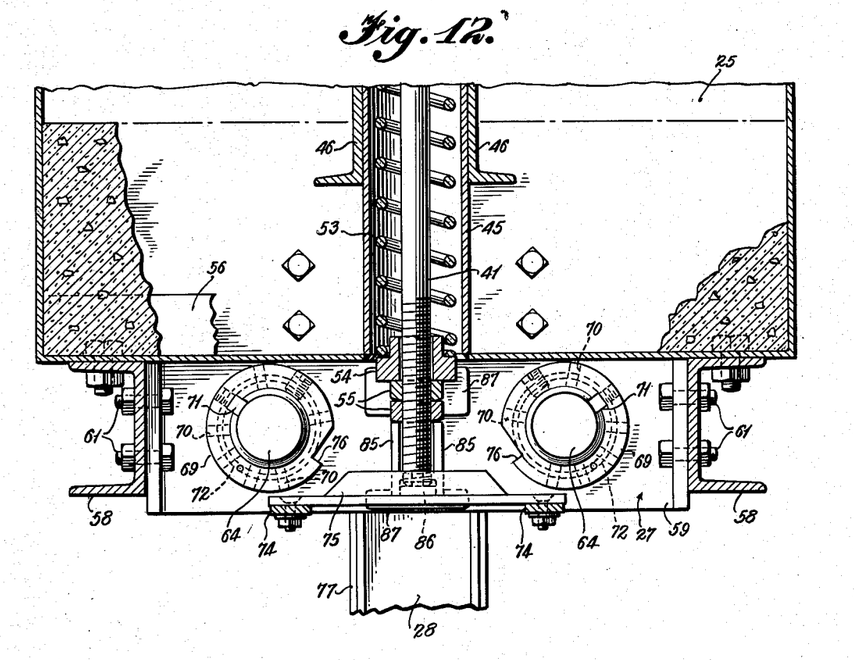
Figure 12 is a fragmentary vertical sectional view taken on the same plane as Fig. 6.

The counterweighted box 25 is illustrated in Figs. 2, 6 and 12 as being provided with a pair of upstanding, cylindrical spring housings 45 which are suitably connected at their lower ends to the bottom of the box 25 and at their upper ends to the channel members 46 which extend lengthwise of the box 25. The lower ends of the spring housings 45 are open while the upper ends are provided with cover plates 47 having central openings therethrough. A suitable seal 48 is fastened to each cover plate 47 by an annular retaining ring 49 which is fastened in place by the studs 51. Spring guides 52 extend downwardly from the cover plates 47 in surrounding relationship to the openings therethrough.

The trip rods 41 and their sleeves 44 are inserted through the openings in the seals 48 and cover plates 47. Springs 53 are positioned in the spring housings 45 with their upper end portions bearing against the cover plates 47 and positioned between the guides 52 and housings 45. A spring washer 54 is fitted on the lower end portion of each of the trip rods 41 and is supported by the locknuts 55.

The counterweighted box 25, therefore, is suspended from the pulley frame 26 by the trip rods 41, the springs 53, and the spring housings 45. Because the pulley frame 26 is supported by the pulley 24 and the conveyor belt 14, the weight of the box 25 and its counterweight contents will effect compression of the springs and movement of the lower end portions of the trip rods 41 inwardly relative to the lower ends of the spring housing 45 until the trip rods 41 assume the positions best illustrated in Figs. 2 and 6.

If it now is assumed that the support afforded by the conveyor belt 14 is suddenly withdrawn, due to parting of the belt or failure of some belt supporting portion of the conveyor, it will be apparent that the pulley 24, and its frame 26, and the counterweighted box 25 will fall. Because all of these elements thus become free falling bodies, the compression forces stored up in the springs 53 will be released and will bring about movement of the pulley frame 26 toward the counterweighted box 25. This relative movement of these two elements will cause the lower end portions of the trip rods 41 to move outwardly of the lower ends of the spring housings, see Fig. 12, to bring about actuation, or tripping, of the safety device 27, as will be described in detail at a later point.

Stiffening members 56 extend laterally across the bottom of the counterweighted box 25 to provide additional strength. Guide flanges 57 extend outwardly from opposite ends of the box 25 for slidably engaging the guide rails 28.

Figure 11:
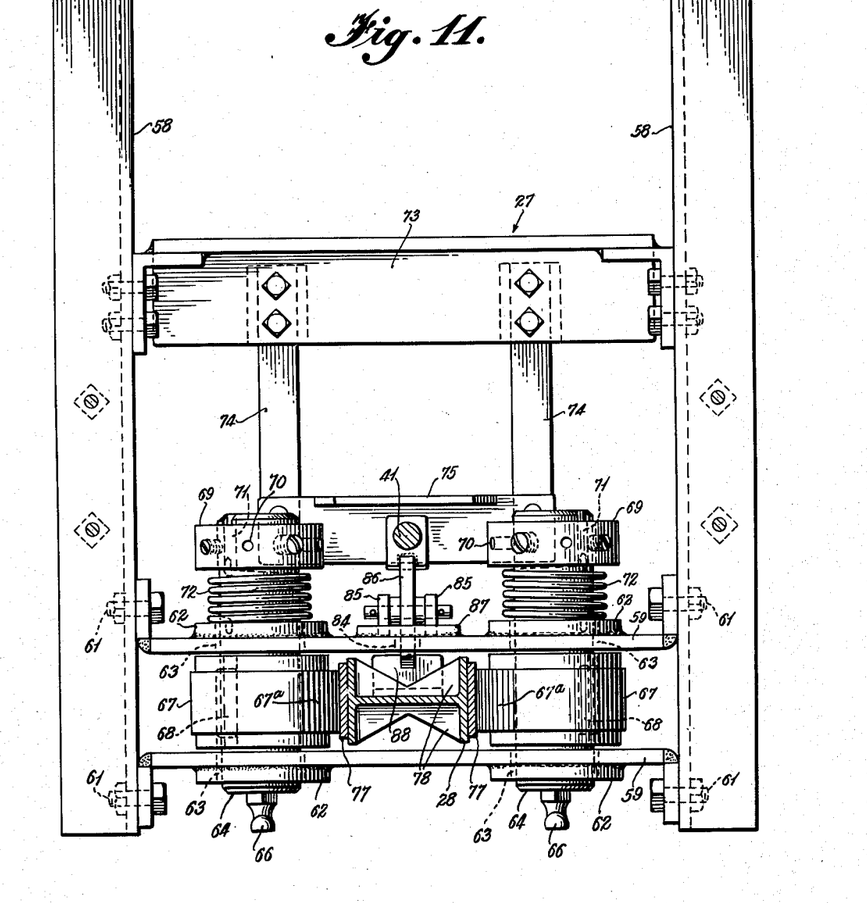
Figure 11 is a fragmentary horizontal sectional view taken on the same plane as Fig. 4.
Figure 13:
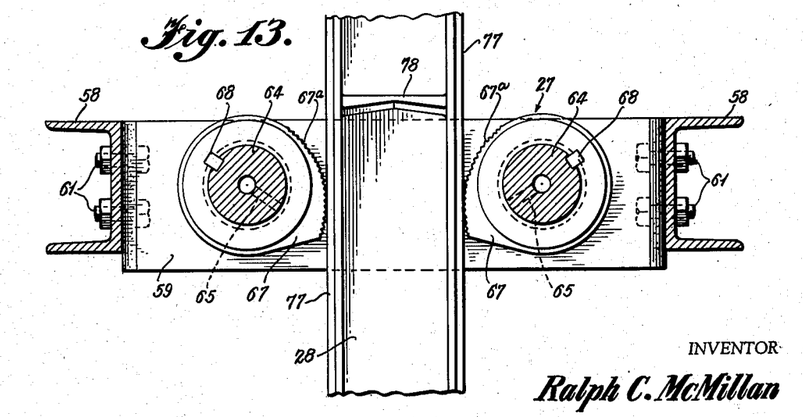
Figure 13 is a detail vertical sectional view similar to Fig. 7 but illustrating the safety cams in their actuated positions.

The safety device 27 is best illustrated in its normal, or unactuated, condition in Figs. 2, 4, 6 and 7 and in its actuated, or tripped, condition in Figs. 11, 12 and 13. A pair of parallel, horizontal channel members 58 form the main frame or bridge of the safety device and have their upper flanges bolted, or otherwise suitably connected, to the bottom of the counterweighted box 25. A pair of spaced cam supporting plates 59 extend between and are connected by the bolts 61 to each of the parallel end portions of the channel members 58, see particularly Fig. 4. The guide rails 28 are centrally located between the cam supporting plates 59 and the channel members 58.

Each pair of cam supporting plates 59 is provided with two sets of alined openings which are located on opposite sides of the guide rails 28. Each of said openings is provided with an annular bushing support 62 suitably connected to the outer fact of the cam supporting plate. Fig. 10 best illustrates a bushing 63 fitted in each of the pair of alined openings through the cam support plates 59 and bushing supports 62. A cam shaft 64 is rotatably mounted in each pair of alined bushings 63 and extends inwardly from the cam supporting plates 59. Lubrication of the cam shafts 64 is provided by grease ports 65 in communication with the shaft nipples 66.

A cam 67, having a toothed or roughened peripheral surface 67a, is mounted on each of the cam shafts 64 between the cam support plates 59 and is connected to its shaft by a key 68. A collar 69, having a series of radial holes 70, is mounted on the inner end portion of each of the cam shafts 64 and is connected thereto by a key 71. A torsion spring 72 is wrapped around each of the cam shafts 64, between the collar 69 and adjacent bushing support 62, with one end portion anchored to the bushing support 62 and the other end portion anchored to the collar 69. A suitable tool, not shown, may be inserted in one of the radial holes 70 of each one of the collars 69 to rotate the collar and its cam shaft 64 to tighten the wrap of the associated spring 72 around the cam shaft. A cam shaft rotating force thereby is stored up in each one of the springs 72 which, when released, will function to rotate the toothed peripheral surface 67a of the cam 67 into engagement with its adjacent guide rail 28.

Figure 4:
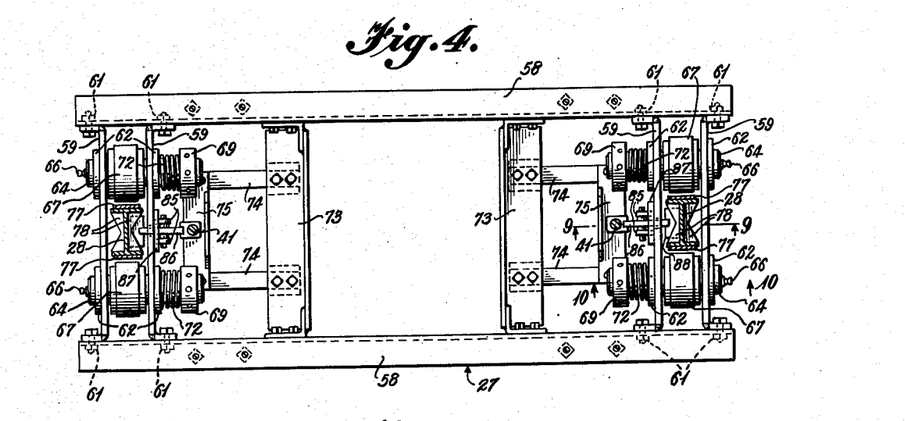
Figure 4 is a horizontal sectional view taken on line 4—4 of Fig. 2.
Figure 5:
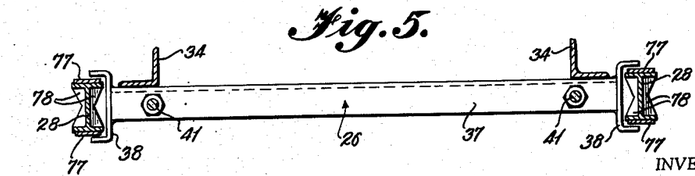
Figure 5 is a horizontal sectional view taken on line 5—5 of Fig. 2.

A tripper bracket 73, see Figs. 2, 4 and 11, is mounted between the channel members 58 at each of their parallel end portions. A pair of leaf springs 74 is connected to the bottom of each of the brackets 73 to incline upwardly therefrom toward the adjacent collars 69. A trip plate 75, see Figs. 2, 4, 6, 11 and 12, extends between and is connected to the free ends of each pair of springs 74 so that the mid-point of each trip plate lies beneath the lower end of the associated trip rod 41. The trip plates 75 are urged upwardly into engagement with the peripheral surfaces of the collars 69 by the springs 74. Each of the collars 69, see Figs. 6, 10, and 12, is provided with a peripheral notch 76 that is adapted to receive the adjacent end of the associated trip plate 75 to prevent rotation of the collar and its cam 67, by the force stored up in its tightened spring 72, in the direction which will cause the cam surface 67a to engage the guide rail 28.

The opposite sides of the guide rails 28 are provided with clamping strips 77 along substantially their entire lengths, while transverse stiffeners 78 are positioned between and connected to the flanges of the guide rails at spaced intervals. Each guide rail 28 is resiliently supported at its lower end on the base 31, see Figs. 2 and 8, by means of an open top box 79 containing a pad 81 of rubber, or other resilient material. A foot plate 82 is connected to the bottom of the guide rail 28 and rests upon the pad 81. Bolts 83 connect each foot plate 82 to its base 31.

The innermost cam supporting plate 59 at each end of the safety device 27 is provided with an opening 84 positioned between a pair of ears 85. A trigger bar 86 is pivotally mounted between each pair of ears 85 and projects through the adjacent opening 84 into the space between the side flanges of the adjacent guide rail 28. The inner ends of the trigger bars 86 rest upon the trip plates 75 directly beneath the trip rods 41. Reinforcing plates 87 are welded to the cam supporting plates 59 above and below the openings 84. A trigger plate 88, see Figs. 2, 4, and 9, is mounted on each guide rail 28 between the side flanges thereof and in vertical alinement with the outer end of the associated trigger bar 86. The elevation of the trigger plates 88 above the base 31 determines the maximum allowable drop of the counterweight, as will be further explained at a later point.

It will be apparent that the tension in the return run of the belt must be maintained relatively constant to prevent slippage between the belt and its driving pulley. It is for this purpose that the vertical gravity take-up is employed.

Referring now to the operation of the gravity take-up, any elongation in the return run of the conveyor belt 14 will be compensated for by a corresponding downward movement of the pulley 24 and its attached counterweighted box 25 to maintain the proper belt tension. As long as the pulley 24 remains suspended in the belt loop and the counterweighted box 25 is free to move vertically of the guide rails 28, proper tension in the return run of the belt will be assured and the conveyor will operate in its intended manner.

Failures in belt conveyor installations most frequently occur as a result of parting of the conveyor belts. This type of failure may occur at any point in the active or return runs of the belt. When such a failure occurs, it is obvious that the belt 14 will no longer support the pulley 24 and its attached counterweighted box 25 and, in the absence of some means for immobilizing the counterweight, it will drop. If the belt 14 breaks adjacent the pulley 24, the fall of the counterweighted box will be very sudden. If the break occurs at a point in the belt a considerable distance from the pulley 24, the descent of the counterweight will be more gradual. The safety device 27 will function in either case to stop the fall of the counterweight before personal injury or property damage can occur.

Considering now the operation of the counterweight safety device 27 when the belt 14 breaks adjacent the pulley 24. The sudden, free fall of the pulley frame 26 and the counterweighted box 25 will permit the compressed springs 53 to expand and bring about downward movement of the projecting end portions of the trip rods 41 until they engage and actuate the associated trip plates 75, see Fig. 12. This actuation of the trip plates causes their ends to be moved out of the notches 76 of the cam controlling collars 69. The release of the collars 69 will permit the springs 72 to rotate the shafts 64 and their cams 67 until the toothed cam faces 67a are placed in clamping engagement with the clamping strips 77 on the opposite sides of the guide rails 28. After the cams 67 have engaged the guide rails, further downward movement of the counterweighted box 25 is prevented by the self-energizing wedging of the cams 67 between the cam shafts 64 and the strips 77 of the guide rails 28.

Actual test operations of the safety device 27 established the fact that the free fall of a gravity take-up counterweight will be in the neighborhood of 1½ inches when the springs 53 are of a proper strength to limit downward settling, or spring compressing, movements of the counterweighted box 25 relative to the pulley frame 26 to 2½ inches. If the relationship between the strength of the springs 53 and the weight of the counterweighted box 25 is changed to permit the box to settle approximately 5 inches relative to the pulley frame 26, the free fall of the counterweight will be increased to a distance of from 4 to 5 inches. By properly proportioning the strength of the springs 53 to the mass of the counterweight, the shock resulting from the rapid deceleration of the counterweight can be almost entirely absorbed by the resilient pads 81.

Considering now the operation of the safety device 27 when the belt of a long conveyor breaks at a point remotely located with respect to the pulley 24, the drag on the belt 14 may retard the sagging rate of its tensioning loop to such an extent that the trip rods 41 will not be actuated at all or will be actuated at such a slow rate that they will not operate the safety device 27. Gradual downward movement of the counterweighted box 25 and its attached safety device 27, however, will cause the outer ends of the trigger bars 86 to engage the trigger plates 88 on the guide rails 28. The trigger bars 86 then will be pivoted to cause their inner ends to engage and depress the trip plates 75. The trip plates 75 are thereby moved out of engagement with the notches 76 in the collars 69 to permit rotation of the cams 67 as previously described. The trigger plates 88, therefore, should be so located as to establish a minimum elevation below which the counterweight may not fall. This minimum elevation should be so fixed that the normal vertical travel of the counterweight device does not cause the trigger bars 86 to contact the trigger plates 88.

It is to be understood that the form of this invention herewith shown and described is to be taken as a preferred example of the same, and that various changes in the shape, size, and arrangement of parts may be resorted to without departing from the spirit of the invention or the scope of the subjoined claims.

Having thus described the invention, I claim:

1. A belt conveyor take-up, comprising a pulley supported by the take-up loop of a conveyor belt, a frame suspended from said pulley, a counterweight resiliently suspended from said frame for movement relative thereto as a result of the sudden withdrawal of the support for said pulley afforded by the conveyor belt, guide means for controlling the direction of movement of the frame and counterweight, spring loaded clamping means connected to said counterweight and positioned to clamp the counterweight to the guide means, means for normally holding the clamping means out of clamping engagement with the guide means, and means for releasing the clamping means as a result of the aforesaid relative movement between the counterweight and its supporting frame.

2. A belt conveyor take-up, comprising a pulley supported by the take-up loop of a conveyor belt, a frame suspended from said pulley, a counterweight resiliently suspended from said frame for movement relative thereto as a result of the sudden withdrawal of the support for said pulley afforded by the conveyor belt, guide means for controlling the direction of movement of the frame and counterweight, spring loaded clamping means connected to said counterweight and positioned to clamp the counterweight to the guide means, means for normally holding the clamping means out of clamping engagement with the guide means, means for releasing the clamping means as a result of the aforesaid relative movement between the counterweight and its supporting frame, and means mounted on said guide means for releasing said clamping means as a result of downward movement of said counterweight a predetermined distance independently of the occurrence of the aforesaid relative movement between said frame and counterweight.

3. A belt conveyor take-up, comprising a pulley supported by the take-up loop of a conveyor belt, a frame suspended from said pulley, a counterweight resiliently suspended from said frame for movement relative thereto as a result of sudden withdrawal of the support for said pulley afforded by the conveyor belt, guide means for controlling the direction of movement of the frame and counterweight, a plurality of spring actuated, self-energizing clamping devices connected to said counterweight and positioned to clamp the counterweight to the guide means, means for normally holding the clamping devices out of clamping engagement with the guide means, and means for disengaging the holding means from the counterweight and its supporting frame to permit movement of said clamping devices into clamping engagement with the guide means.

4. A belt conveyor take-up, comprising a pulley supported by the take-up loop of a conveyor belt, a frame suspended from said pulley, a counterweight resiliently suspended from said frame for movement relative thereto as a result of sudden withdrawal of the support for said pulley afforded by the conveyor belt, guide means for controlling the direction of movement of the frame and counterweight, a plurality of spring actuated, self-energizing clamping devices connected to said counterweight and positioned to clamp the counterweight to the guide means, means for normally holding the clamping devices out of clamping engagement with the guide means, means mounted on said frame for disengaging said holding means from said clamping devices as a result of relative movement between the counterweight and its supporting frame to permit movement of said clamping devices into clamping engagement with said guide means, and means mounted on said guide means for disengaging said holding means from the clamping devices as a result of downward movement of said counterweight a predetermined distance independently of the occurrence of the aforesaid relative movement between said frame and counterweight.

5. A belt conveyor take-up, comprising a pulley supported by the take-up loop of a conveyor belt, a frame suspended from said pulley, a counterweight movably suspended from said frame, resilient means for urging said counterweight and frame toward each other as a result of the sudden withdrawal of the support for said pulley afforded by the belt, guide means for controlling the direction of movement of the frame and counterweight, spring loaded clamping means rotatably connected to said counterweight and positioned to clamp said counterweight to the guide means, means for normally holding the clamping means out of clamping engagement with the guide means, and means for releasing the clamping means as a result of the aforesaid relative movement between said counterweight and its supporting frame.

6. A belt conveyor take-up, comprising a pulley supported by the take-up loop of a conveyor belt, a frame suspended from said pulley, a counterweight movably suspended from said frame, a plurality of springs mounted between said frame and counterweight for urging the frame and counterweight toward each other as a result of the sudden withdrawal of the support for said pulley afforded by the belt, vertical guides for controlling the direction of movement of the frame and counterweight, spring loaded clamping means connected to said counterweight and positioned to clamp said counterweight to the guides, means for normally holding the clamping means out of clamping engagement with said guides, means for releasing the clamping means as a result of the aforesaid relative movement between said counterweight and its supporting frame, and means mounted on said guides for releasing said clamping means as a result of downward movement of said counterweight a predetermined distance independently of the occurrence of the aforesaid relative movement between said frame and counterweight.

7. A belt conveyor take-up, comprising a pulley supported by the take-up loop of a conveyor belt, a frame suspended from said pulley, a counterweight resiliently suspended from said frame for movement relative thereto as a result of the sudden withdrawal of the support for said pulley afforded by the conveyor belt, guide means for controlling the direction of movement of the frame and counterweight, a plurality of cams rotatably connected to said counterweight and positioned to clamp the counterweight to said guide means when rotated into engagement with the latter, a spring connected to each one of said cams for rotating the latter into engagement with said guide means, means normally holding the cams out of engagement with the guide means, and means for disengaging said holding means from said cams as a result of the aforesaid relative movement between said counterweight and supporting frame.

8. A belt conveyor take-up, comprising a pulley supported by the take-up loop of a conveyor belt, a frame suspended from said pulley, a counterweight resiliently suspended from said frame for movement relative thereto as a result of the sudden withdrawal of the support for said pulley afforded by the conveyor belt, guide means for controlling the direction of movement of the frame and counterweight, a bridge attached to said counterweight for movement therewith, a pair of opposed cams rotatably mounted on said bridge and positioned to clamp the guide means therebetween when rotated, means for effecting rotation of said cams, means mounted on said bridge for normally preventing rotation of said cams, and means connected to said frame for movement relative to said bridge as a result of the aforesaid relative movement between said frame and counterweight to release the cams from their rotation preventing means.

9. A belt conveyor take-up, comprising a pulley supported by the take-up loop of a conveyor belt, a frame suspended from said pulley, a counterweight resiliently suspended from said frame for movement relative thereto as a result of the sudden withdrawal of the support for the pulley afforded by the conveyor belt, vertical guides for controlling the direction of movement of the frame and counterweight, a bridge attached to said counterweight for movement therewith, a plurality of pairs of opposed cams rotatably mounted on said bridge and positioned to clamp the guide means therebetween when rotated, springs for rotating the cams, means mounted on said bridge for normally preventing rotation of said cams, and trip rods connected to said frame for movement relative to said bridge as a result of the aforesaid relative movement between the counterweight and supporting frame to release the cams from their rotation preventing means.

10. A belt conveyor take-up, comprising a pulley supported by the take-up loop of a conveyor belt, a frame suspended from said pulley, a counterweight movably suspended from said frame, a plurality of springs mounted between said frame and counterweight for urging the frame and counterweight toward each other as a result of the sudden withdrawal of the support for said pulley afforded by said belt, vertical guides for controlling the direction of movement of the frame and counterweight, a plurality of cams rotatably connected to said counterweight and positioned to clamp the counterweight to the guides when rotated into engagement with the latter, a plurality of springs for rotating the cams into engagement with said guides, trip plates connected to said counterweight for preventing rotation of the cams by said springs, and trip rods connected to said frame for movement relative to said counterweight as a result of the aforesaid relative movement between the counterweight and supporting frame to actuate the trip plates to release the cams.

11. A safety device for checking an abnormal fall of the belt supported counterweight of a conveyor belt take-up, comprising a counterweight, means for guiding the belt tensioning movements of the counterweight, a bridge connected to the counterweight for movement therewith along the guiding means, spring loaded clamping means rotatably mounted on said bridge and positioned to clamp the bridge to the guide means when actuated, means carried by said bridge to normally engage said clamping means and prevent actuation of the latter, and means, actuated as a result of the sudden failure of the conveyor belt to support the counterweight, for disengaging the bridge carried means from the clamping means to permit actuation of the clamping means.

12. A safety device for checking an abnormal fall of the belt supported counterweight of a conveyor belt take-up, comprising a counterweight, means for guiding the belt tensioning movements of the counterweight, a bridge connected to the counterweight for movement therewith along the guiding means, a plurality of cams each independently, rotatably mounted on said bridge and positioned to clamp the bridge to the guide means when rotated, means for independently rotating said cams, means carried by said bridge to normally lock said cams in a stationary position, means, actuated as a result of a sudden failure of the conveyor belt to support the counterweight, for releasing the cams from the locking means to permit rotation of the cams, and means, actuated as a result of downward movement of said counterweight a predetermined distance, for releasing the cams from the locking means to permit rotation of the cams independently of the occurrence of the aforesaid sudden failure of the belt to support the counterweight.

13. A safety device for checking an abnormal fall of the belt supported counterweight of a conveyor belt take-up, comprising a counterweight, means for guiding the belt tensioning movements of the counterweight, a bridge connected to the counterweight for movement therewith along the guiding means, a plurality of cams each independently, rotatably mounted on said bridge and positioned to clamp the bridge to the guide means when rotated, a plurality of springs each connected to a different one of said cams for independently rotating the latter, trip means movably mounted on said bridge and normally positioned to lock the cams against rotation by the springs, and means, actuated as a result of a sudden failure of the conveyor belt to support the counterweight, for moving said trip means from the aforesaid position for locking the cams against rotation.

14. A safety device for checking an abnormal fall of the belt supported counterweight of a conveyor belt take-up, comprising a counterweight, a plurality of vertical posts for guiding the belt tensioning movements of the counterweight, a bridge connected to the counterweight for movement therewith along the vertical posts, a plurality of cams arranged in pairs and each independently, rotatably mounted on said bridge, said pairs of cams being positioned on opposite sides of said posts to clamp the bridge to the posts when rotated, separate means for rotating each of said cams, means carried by said bridge to normally lock the cams against rotation by the cam rotating means, and means, actuated as a result of the sudden failure of the conveyor belt to support the counterweight, for rendering the locking means inoperative to prevent rotation of the cams.

15. A safety device for checking an abnormal fall of the belt suported counterweight of a conveyor belt take-up, comprising a counterweight, a plurality of vertical posts for guiding the belt tensioning movements of the counterweight, a bridge connected to the counterweight for movement therewith along the vertical posts, a plurality of cams each independently rotatably mounted on said bridge, said cams being arranged in pairs on opposite sides of said posts to clamp the bridge to the posts when rotated, a plurality of springs each connected to a different one of said cams for independently rotating the latter, trip means movably mounted on said bridge and normally positioned to lock the cams against rotation by said springs, and means, actuated as a result of sudden failure of the conveyor belt to support the counterweight, for moving said trip means from the aforesaid position for locking the cams against rotation.

16. A safety device for checking an abnormal fall of the belt supported counterweight of a conveyor belt take-up, comprising a counterweight, a plurality of vertical posts for guiding the belt tensioning movements of the counterweight, a bridge connected to the counterweight for movement therewith along the vertical posts, a plurality of cams each independently, rotatably mounted on said bridge, said pairs of cams being arranged in pairs on opposite sides of said posts to clamp the bridge to the posts when rotated, a plurality of springs each connected to a different one of said cams for independently rotating the latter, a plurality of trip plates resiliently mounted on said bridge, each normally positioned to lock a different pair of cams against rotation by said springs, and a plurality of trip rods, actuated as a result of the sudden failure of the conveyor belt to support the counterweight, for moving said trip plates from their aforesaid positions for locking the cams against rotation.

RALPH C. McMILLAN.

REFERENCES CITED

The following references are of record in the file of this patent:

UNITED STATES PATENTS

| Number | Name | Date |
| --- | --- | --- |
| 280,419 | Voerde | July 3, 1883 |
| 395,883 | Dodge | Jan. 8, 1889 |
| 744,233 | Read | Nov. 17, 1903 |
| 857,286 | Jensen | June 18, 1907 |
| 1,278,380 | Plym | Sept. 10, 1918 |